July 21, 1936.     E. BOEHM     2,048,056
METHOD AND PRODUCT OF HYBRIDIZING PLANTS
Filed March 18, 1935
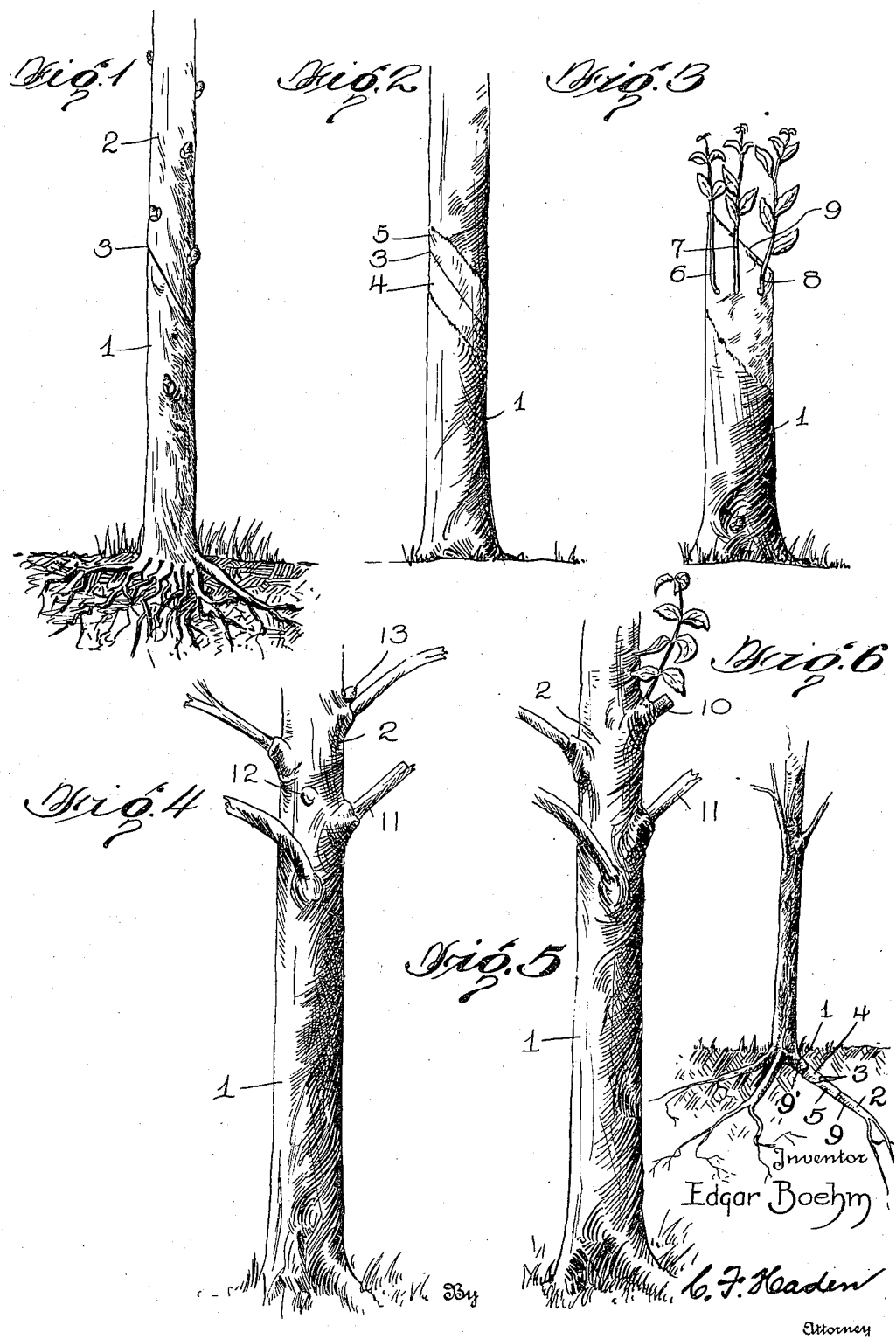

Patented July 21, 1936

2,048,056

UNITED STATES PATENT OFFICE 2,048,056

METHOD AND PRODUCT OF HYBRIDIZING PLANTS

Edgar Boehm, Monette, Ark.

Application March 18, 1935, Serial No. 11,738

6 Claims. (Cl. 47—6)

This invention relates to a new and improved method and product of hybridizing plants. It was developed in producing new varieties of fruits, but it can be practised on any plant growth which can be successfully grafted either in the growth above ground or in the roots, and it is my intention to claim it in its broadest sense. In this specification I describe the hybridization of fruit trees and fruit bushes merely as illustrative; but I do not wish to be restricted to such use because the process may be used in developing hybrid flowers in those bushes which can be grafted in any well-known way.

When the pollen of the flower of one plant is deposited upon the pistil of the flower of another plant, both plants being of the same genus but of different species of that genus, cross-fertilization frequently occurs, and the plant which grows from the seed thus fertilized will be a hybrid, partaking of the characteristics of both of the parents but not exactly like either of them.

In the usual method of hybridizing, the pollen of a flower of one species is transferred to and placed upon the pistil of a flower of a different species, both flowers being of the same genus. To do this successfully it is necessary to remove the stamens of the flower to be cross-fertilized, before they discharge any of their pollen. Then pollen from a flower of a different species of the same genus is brought to and placed upon the pistil which remains in the flower which is to be cross-fertilized.

There are many objections and disadvantages in trying to hybridize by this well known method.

In the very beginning, some pollen may be shaken off, when cutting out the stamens, and drop upon the pistil of the same flower. In such a case, all further operations are useless and merely a waste of time, because the flower will thus be fertilized by its own pollen and no hybridization results.

Then, too, both flowers must be in exactly the same state of maturity; that is, the pollen of one flower must be in the proper condition to fertilize, and the pistil of the other flower must be in the proper condition to be fertilized. If either flower is not in the proper condition, cross-fertilizing will not take place. As the flowers of different species of the same genus do not always mature at exactly the same time, it happens that some of the crosses that, theoretically, appear to be most desirable hybridizations cannot be made by cross-pollenization.

Another, probably the greatest disadvantage is: at best, cross-pollenization can be practiced only during the very brief period of time, when the flowers of both species are in bloom, a period so brief in some it is a matter of only a few hours.

Then, too, it is necessary to wait for years for the seed to grow and the plant to mature and bear fruit before the result of the hybridization can be known, or whether there has been any hybridization at all.

I have invented a process of hybridization which overcomes all these objections and disadvantages and frequently produces hybrid fruit the same growing season my hybridization process has been employed.

The principal object and the principal advantage in employing my process is to be able to practice hybridizing leisurely, at any time during the entire year when budding and ordinary grafting may be successfully done on similar plants.

Another important object is to know positively that hybridization has taken place as soon as the plant begins to grow, without having to wait for the planting of the seed, the growing of the plant, the maturing of the plant and its fruiting, before it can be determined if hybridization has occurred.

Another object which is peculiar to and is exclusively derived from my method, only, is: the ability to control, in a great degree, the result of the hybridization to resemble one parent plant more than the other or to have it partake of the nature of both parent plants approximately equally.

Other objects and advantages will appear as the description of my process proceeds.

To illustrate the best way I have devised to practice my invention I have filed the accompanying sheet of drawings which is made a part of this specification, and in which Figure 1 illustrates an ordinary graft of the style usually called a splice graft, the wax and the wrapping commonly used being omitted;

Fig. 2 shows how the graft of Fig. 1 looks after a period of growth;

Fig. 3 shows the scion cut off above the area of mixed protoplasmic growth and twigs growing from the area affected by the grafting;

Fig. 4 shows how bud sports originate;

Fig. 5 shows how the whole growing power of the tree may be directed to one or more auxiliary buds; and Fig. 6 shows how my method can be applied to berry bushes or other pithy stalked growths.

My method is not dependent upon the style of grafting used. I have shown splice grafting merely as illustrative; but whip grafting, tongue grafting, cleft grafting, crown grafting, rind grafting, or any other style of grafting will do and it may be practiced by budding and by root grafting.

As it is desirable to be able to determine, easily, the approximate area of the bark of the stock and the bark of the scion, contiguous to the point of union of the two parts of the graft, which has been modified by the growth after grafting, I prefer to use splice grafting, saddle grafting, tongue grafting, or whip grafting, merely because I seem to be better able to locate the limits of the modified area when I use grafting of these types; however, the style of grafting preferred is immaterial to the success of the method and is determined almost wholly by the size and the condition of the stock and scion and the whim of the operator.

In the several views of the drawing and in the detailed specification wherever an element is designated by a reference character the particular character used will be found always applied to that element and to no other.

The stock is designated by 1, the scion by 2, and the line of union between these parts by 3. Whenever a graft makes a satisfactory growth, there is, after such period of growth, an area above and below the union, easily determinable, in which the nature of the protoplasm of growth is modified by the mixture of the sap of both the stock and the scion. This area of mixed protoplasmic effect is designated by 4 and 5 respectively, in Figs. 2 and 6. The power of the sap of the stock and the power of the sap of the scion to influence the hybridizing character of the growth near the union produced by grafting decrease as the distance from the line of union of the two parts increases. The protoplasm is approximately equally potent and mixed at the line of union of the stock and the scion.

After the complete union of the stock and the scion, sprouts from adventitious buds usually spring out of the area of mixed protoplasmic influence. However, to insure that sprouts do spring from the area of mixed protoplasmic growth, I cut off the scion just above the area modified by the mixture of the sap from the two parts, as indicated in Fig. 3, and to prevent bleeding of the severed tree, it is desirable to cover the stump with some water-proof material, such as grafting wax, paint, asphaltum, tar or the like.

Soon after the scion is cut off as indicated at 9, sprouts 6, 7, and 8 spring out from the area of mixed protoplasmic influence, because of the excess of sap checked in its upward flow by the waterproof material adhering to the cut surface of the stump.

Usually a greater number of twigs start growing from the area of mixed protoplasmic influence than should be permitted to remain, and, after selecting the twigs to be developed into the crown of the tree, all the others should be pruned off.

The horticulturist should excerise his own judgment as to the character of the fruit desired from the bearing tree; but I find it more interesting and prefer to preserve some limbs 6, which take out below the line of union, some limbs 7, which grow exactly over the line of union and some limbs 8, which grow out above the line of union. Such selected limbs should be spaced circumferentially about the trunk to insure a properly balanced crown to the tree.

The fruit borne by limbs 6 will partake more of the nature of the fruit borne by the limbs of the stock growing entirely below the area of influence of the mixed protoplasm; the fruit borne by limbs 7 will partake equally of the natures of the stock and the scion; and the fruit borne by limbs 8 will partake more of the character and nature of the scion.

Should it be thought desirable to have fruit from the scion uninfluenced by the characteristics of the stock, all it is necessary to do is to make the cut 9 above the area influenced by the mixed protoplasm of the section contiguous the graft and permit branches to grow from the scion above the area so influenced by the mixed protoplasm.

Thus it is possible to have five varieties of fruit produced by a single grafting operation.

Assuming that an apple stock and a pear scion are used, the five different varieties of fruit from one tree the result of a single grafting operation will be as follows: First, the unmodified apple of the stock; second, the hybrid fruit in which the apple predominates, borne by limbs 6; third, the hybrid fruit in which the characteristics of the apple of the stock and the pear of the scion are approximately equal, borne by limbs 7; fourth, the hybrid fruit in which the pear nature predominates, borne by limbs 8; and fifth, the fruit of the pear scion which is uninfluenced by the apple characteristics, borne by limbs which grow out of the scion above the area modified by the mixed protoplasm of the scion and the stock.

Axillary buds 13 and adventitious buds 12 may be forced to grow by removing the bark from branches growing near them in the area of mixed protoplasm as shown at 10 and 11, see Fig. 5.

The growth of branches springing from adventitious buds 12 and axillary buds 13 is greatly augmented by killing undesirable limbs by girdling them or by stripping the bark therefrom or the same increased growth may be secured by removing such limbs bodily and waterproofing the wounds made by such pruning.

In practicing my method upon blackberry bushes, raspberry bushes, and the like, the roots should be operated upon; because it is almost impossible to graft the tops. Fig. 6 illustrates the mode of operation upon such bushes, which have large soft pithy growth tops, not suitable for grafting. In this figure 1 indicates the root stock or growing plant, 2 a root scion, 3 the line of union, 4 and 5 the area of mixed protoplasmic growth, 9 indicates where the scion should be severed and $9^1$ shows where the united graft should be cut from the growing plant. Usually, during the time the root graft is making a proper union, numerous buds or sprouts appear upon the uniting roots; but if they do not or if they do not appear at places desired, I cut out the graft on the lines 9 and $9^1$ and plant the piece of united root in a hot-bed or other suitable place for forcing. After a short time, buds and sprouts appear throughout the whole length of the planted root. I then take up the root and separate it into parts having one or more sprouts on each part and then plant the parts which will produce numerous plants each of which is a hybrid of the two plants used in the root-grafting process.

Having fully explained my invention and the best way to practice it, what I claim is:

1. The method of hybridizing plants which consists in grafting a scion to a stock whereby there is produced in the vicinity of the line of union between the stock and the scion an area of growth wherein the protoplasm of the stock and the protoplasm of the scion are mixed and then preventing the growth of limbs from any other area than that influenced by the said mixture of protoplasm.

2. The method of hybridizing plants which consists of inserting a bud-scion into a stock and then limiting future growth of the stock to branches springing from the immediate vicinity of the union of the bud-scion and the stock where the protoplasm of the new growth is derived from both the bud-scion and the stock, by gradually pruning away all other growth.

3. The method of hybridizing the apple and the pear which consists of grafting a scion of one of them to a stock of the other one of them and then preventing the growth of limbs from all other parts of the grafted tree excepting that area about the union of the stock and the scion wherein the newly formed protoplasms of the growing apple wood and the growing pear wood are mixed.

4. The method of hybridizing plants having pithy stems which consists in grafting a root-scion of one plant to the root-stock of a growing plant, removing the grafted section of the root-graft and planting it, then after sprouts have appeared upon the planted root-graft, severing such root-graft into portions each of which has one or more sprouts, and then planting the several portions whereby hybridized plants are produced.

5. The plant which is the product of the method of claim 1, characterized by varietal qualities differing from those of either the stock or the scion in a degree corresponding to the distance of origin of said limbs from the point of union of the stock and the scion.

6. The plant which is the product of the method of claim 1, characterized by varietal qualities differing from those of either the stock or the scion, the characteristics of the stock or the scion predominating in the preserved limbs in a degree corresponding to the distance of their origin on the stock or on the scion, respectively, from the line of union between the stock and the scion.

EDGAR BOEHM.